United States Patent [19]

Levy

[11] Patent Number: 4,517,592

[45] Date of Patent: May 14, 1985

[54] TELEVISION SYSTEM

[76] Inventor: Paul M. Levy, 3 Butternut Ct., Dix Hills, N.Y. 11746

[21] Appl. No.: 425,912

[22] Filed: Sep. 28, 1982

Related U.S. Application Data

[63] Continuation-in-part of Ser. No. 410,121, Aug. 20, 1982, abandoned.

[51] Int. Cl.³ .............................................. H04N 9/54
[52] U.S. Cl. ............................................ 358/92; 358/3;
 358/11; 358/140
[58] Field of Search ................... 358/3, 11, 12, 86, 91,
 358/92, 142, 146, 140

[56] References Cited

U.S. PATENT DOCUMENTS

| | | | |
|---|---|---|---|
| 3,061,669 | 10/1962 | Leek ........................ | 178/6.8 |
| 3,488,435 | 1/1970 | Eilenberger .................. | 178/6.8 |
| 3,586,767 | 6/1971 | Morchand .................... | 178/5.6 |
| 3,637,926 | 1/1972 | Morchand .................... | 178/5.6 |
| 3,697,675 | 10/1972 | Beard ........................ | 178/6.5 |
| 3,700,793 | 10/1972 | Borsuk ....................... | 358/3 |
| 3,725,571 | 4/1973 | Justice ....................... | 178/5.2 R |
| 3,745,242 | 7/1973 | Justice ....................... | 178/6 |
| 3,896,487 | 7/1975 | Tesler ........................ | 178/5.2 |
| 3,903,358 | 9/1975 | Roese ........................ | 178/6.5 |
| 3,991,266 | 11/1976 | Baer ......................... | 358/146 |
| 4,027,333 | 5/1977 | Kaiser ....................... | 358/146 |
| 4,266,240 | 5/1981 | Levy ......................... | 358/3 |
| 4,287,528 | 9/1981 | Levy ......................... | 358/3 |

*Primary Examiner*—Michael A. Masinick
*Attorney, Agent, or Firm*—Morgan, Finnegan, Pine Foley & Lee

[57] ABSTRACT

Two embodiments of a non-compatible television system are disclosed. In the first embodiment, two video sources of color television picture information, comprising an independent or stereoscopic pair of real-time images, are encoded and transmitted over a standard bandwidth channel to a non-standard television receiver, i.e., one with means for decoding the encoded transmission. In the case of independent images the received encoded video signal is decoded to recover the two video sources for display; and in the case of stereoscopic images the received encoded video signal is decoded for presentation of stereoscopic imagery. In the second embodiment, a single video source of real-time color television picture information is encoded and transmitted over a half standard bandwidth channel to a non-standard television receiver. The received encoded video signal is decoded to recover the single video source for display. In both embodiments, the encoded video signal information may be transmitted to the receiver by means of a standard broadcast channel, a closed circuit channel, video recording and subsequent playback or any sequence of the preceding methods.

63 Claims, 6 Drawing Figures

2 SOURCE ALTERNATE FRAME, FOR N =

| e) $V_E(N,n) =$ | $V_A(N,n)$ | 3 | | 5 | | 7 | |
| | $+V_B(N,n)$ | | 4 | | 6 | | 8 |

| f) $V_a(N,n) =$ | $V_A(N,n)$ | 3 | 3 | 5 | 5 | 7 | 7 |

| g) $V_b(N,n) =$ | $V_B(N,n)$ | 2 | 4 | 4 | 6 | 6 | 8 |

2 SOURCE ALTERNATE MERGED FRAME, FOR N =

| h) $V_E(N,n) =$ | $V_A(N,n)$ | 3 | | 5 | | 7 | |
| | $+V_A(N,n)$ | 2 | | 4 | | 6 | |
| | $+V_B(N,n)$ | | 4 | | 6 | | 8 |
| | $+V_B(N,n)$ | | 3 | | 5 | | 7 |

| i) $V_a(N,n) =$ | $V_A(N,n)$ | 3 | 3 | 5 | 5 | 7 | 7 |
| | $+V_A(N,n)$ | 2 | 2 | 4 | 4 | 6 | 6 |

| j) $V_b(N,n) =$ | $V_B(N,n)$ | 2 | 4 | 4 | 6 | 6 | 8 |
| | $+V_B(N,n)$ | 1 | 3 | 3 | 5 | 5 | 7 |

SINGLE SOURCE HALF BANDWIDTH, FOR N =

| k) $V_E(N,n) =$ | $V_A(N,n)$ | 2 | | 4 | | 6 | |
| | $+V_A(N,n)$ | 1 | | 3 | | 5 | |

| l) $V_a(N,n) =$ | $V_a(N,n)$ | | | 2 | 2 | 4 | 4 |
| | $+V_a(N,n)$ | | | 1 | 1 | 3 | 3 |

FIG. 6

TELEVISION SYSTEM

BACKGROUND OF THE INVENTION

This is a continuation-in-part of pending U.S. patent application Ser. No. 410,121, filed Aug. 20, 1982, now abandoned.

This invention relates to the field of television systems, and more specifically to non-compatible television systems.

Applicant's U.S. Pat. Nos. 4,266,240 and 4,287,528, the disclosures of which are incorporated herein by reference, addressed the subject of compatible transmission of two television pictures by means of a standard broadcast channel. As described therein, compatible transmission provides a method of transmitting two TV programs simultaneously over a single broadcast channel. The two programs comprise the "normal" program and an added "piggy-back" program. Standard TV receivers will reproduce the "normal" program without interference by the "piggy-back" program, while non-standard receivers will reproduce the "piggy-back" program.

This application addresses the subject of non-compatible transmission of two television pictures by means of a standard bandwidth channel but precludes standard receivers from reproducing either of the two transmitted television pictures. In order to reproduce both transmitted pictures it is necessary to utilize a non-standard receiver, i.e., one with means for decoding the encoded transmission. This method of non-compatible transmission is applicable, for example, to closed circuit TV, cable TV, pre-recorded video discs and tapes, satellite communication channels, over-the-air subscription TV, and direct broadcast TV.

A method of time division multiplexing of two video pictures over a standard bandwidth closed circuit channel is described in U.S. Pat. No. 4,027,333. This system transmits the odd-numbered fields of the first video source in alternation with the even-numbered fields of the second video source. Reception and reconstruction of the two pictures is accomplished by alternately storing the successive odd and even-numbered fields in a field store having a delay of one field plus or minus half a line and interlacing the delayed fields with their respective undelayed fields to recreate the two separate pictures. A limitation and drawback of this method is that it sacrifices vertical resolution since each TV image is limited to one half the number of available TV lines comprising the source image.

It is believed that prior to the present invention, there has not been available a non-compatible television system having means for encoding two video sources of color television picture information comprising an independent or stereoscopic pair of real-time images for transmission over a standard bandwidth channel, and having means for recovering the two video source signals for display, while retaining the vertical resolution of the source images. The attributes of such a system are apparent. They include the capability of conveying and rendering two real-time color television pictures by means of a standard broadcast channel or closed circuit channel, i.e., satellite, cable, recording/playback, while maintaining the vertical resolution of the source video signals. Thus, the need for such a system has gone unfulfilled.

It is accordingly a general object of the present invention to overcome the aforementioned limitations and drawbacks associated with known encoding and decoding methods and to fulfill the needs mentioned by providing a television system having all of the desirable attributes noted above.

It is a specific object of the invention to provide an improved television system.

It is a further object of the invention to provide a two source standard bandwidth non-compatible television system.

It is still another object of the invention to provide a single source half standard bandwidth non-compatible television system.

SUMMARY OF THE INVENTION

The foregoing and other objects and advantages which will be apparent in the following detailed description of the alternative and preferred embodiments, or in the practice of the invention, are achieved by the invention disclosed herein, which generally may be characterized as a non-compatible television system comprising a two source standard bandwidth television system and a single source half standard bandwidth television system. The first system provides the means for encoding two video sources of real-time television picture information for conveyance over a standard bandwidth channel, means for conveying this encoded video signal to a non-standard television receiver, and means for decoding the encoded video signal to recover the two video sources for display. The second system provides the means for encoding a single video source of real-time television picture information for conveyance over a half standard bandwidth channel, means for conveying this encoded video signal to a nonstandard television receiver, and means for decoding the encoded video signal to recover the single video source for display.

BRIEF DESCRIPTION OF THE DRAWINGS

Serving to illustrate exemplary embodiments of the invention are the drawings of which.

DETAILED DESCRIPTION OF THE PREFERRED EMBODIMENT

Figure 6:
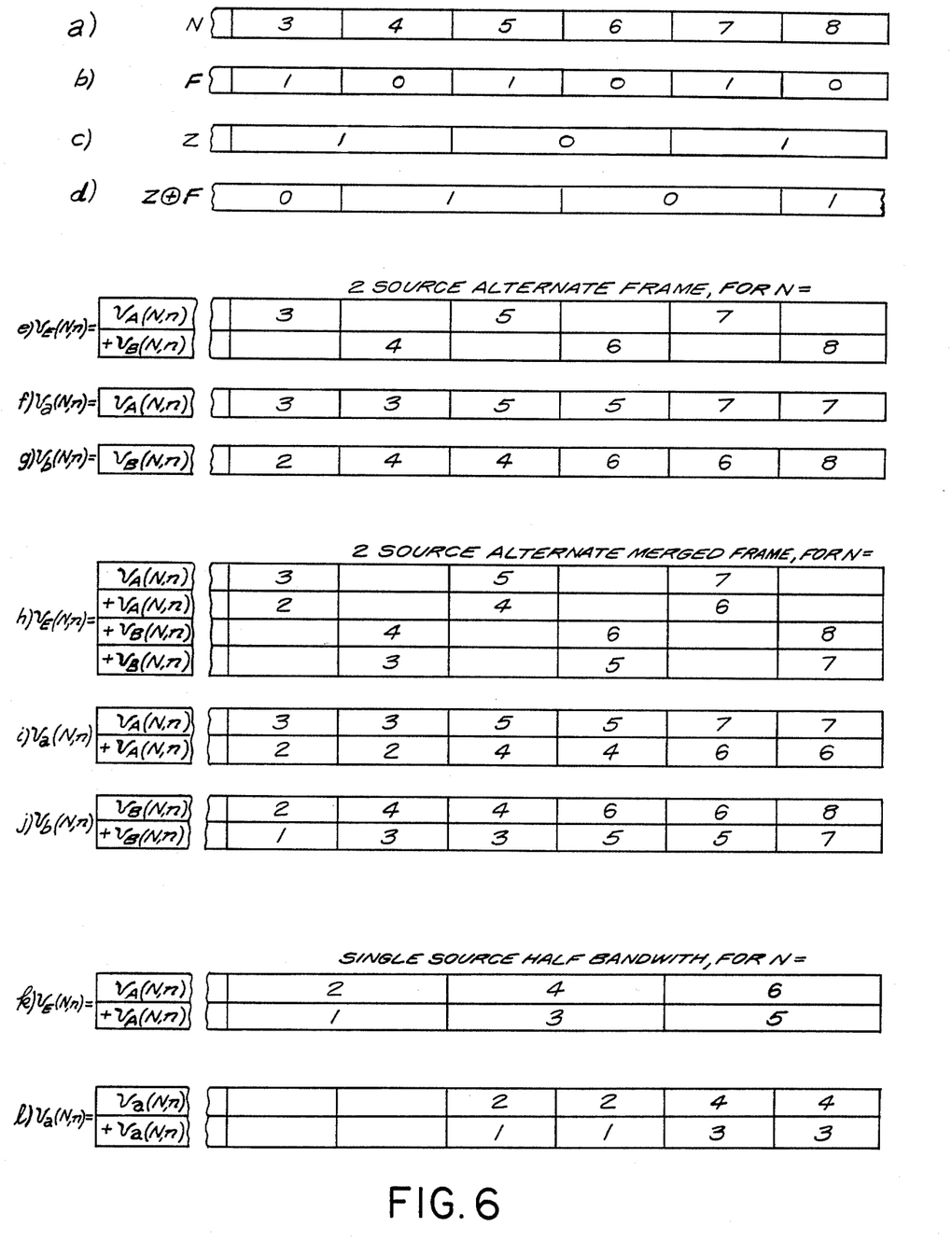
FIG. 6 is a timing diagram for the various video encoders and video decoders utilized in the exemplary embodiments of the invention.

In order to understand the symbolic representation of the encoding and decoding functions that form part of this description and their schematic embodiments, it will be helpful to refer to the timing diagram illustrated in FIG. 6.

In FIG. 6a, N represents the current television frame number of the video source, where sequential frames are consecutively numbered. In FIG. 6b, F is a derived binary logic signal indicating an odd or an even current frame number, where F=1 represents an odd number and F=0 represents an even number. Each frame comprises an odd field interlaced sequentially and spatially with an even field, as required for 2:1 interlacing. The odd field comprises the set of consecutive odd numbered television lines and the even field comprises the set of the intervening consecutive even numbered television lines. The current line number is designated by n, where n = 1, 3, 5, 7 ... 525, 2, 4, 6, 8 ... 524, 1, 3 ... In FIG. 6c, Z is a derived binary logic signal indicating alternate contiguous frame pairs of the video source, where Z=1 represents the first set of contiguous frame pairs, and Z=0 represents the second set of contiguous frame pairs, interleaved with the first set. In FIG. 6d, Z⊕F is a derived binary signal which represents the logical exclusive OR function of Z and F. Other logical functions such as AND, OR and NEGATION are represented by the symbols . , + and ⁻, respectively.

The derived binary signals described above are formed by currently used techniques, however, in order to derive the F and Z signals at the receiver, it is necessary to transmit synchronizing signals for F and Z in addition to the standard TV synchronizing signals. These additional synchronizing signals may be transmitted during the appropriate vertical retrace periods. Methods of inserting these additional synchronizing signals at the transmitter and recovering them at the receiver are not addressed since they are well known by those skilled in the art.

TWO SOURCE STANDARD BANDWIDTH SYSTEM

In this system two video sources, which may comprise an independent pair or a stereoscopic pair of television real-time pictures, are utilized. The first video source provides a second video signal, and the second video source provides a second video signal in time synchronism with the first video signal.

In addition to the encoding means and decoding means described in detail below, several methods of converting the two video signals, comprising a stereoscopic pair, as rendered by the two source decoder, to a time sequential format to allow stereoscopic viewing on a single display device, are utilized. The converting methods and the implementation thereof are described in detail in the aforementioned U.S. Pat. No. 4,266,240. They include a 2:1 interlace converter, a 4:1 interlace converter, and a double 2:1 interlace converter.

Similarly, other functions as may be required for transmission, reception, synchronization, black level insertion, and methods for the display of the rendered video imagery are not addressed since they are well known by those skilled in the art.

Two alternative and preferred methods of performing the encoding and corresponding decoding functions and the implementation thereof are described below. These methods are, the Two Source Alternate Frame Method and the Two Source Alternate Merged Frame Method. Each of these methods time shares a standard bandwidth channel between the two video sources. The methods differ in their technique of processing the video signals corresponding to each source prior to multiplexing.

I. The Two Source Alternate Frame Method (a) Encoding

Referring to FIG. 6e, the encoded video signal is formed by multiplexing the two video signals corresponding to each of the video sources, at the television frame rate, with the switching occurring between successive frames. The encoding function for the Two Source Alternate Frame Method may be written as:

$$v_E(N,n) = [v_A(N,n)] \cdot [F] + [v_B(N,n)] \cdot [\bar{F}] \quad (1)$$

where:
  N ≡ Current frame number
  n ≡ Current line number
  $v_A(N,n)$ ≡ First video signal corresponding to frame N, line n
  $v_B(N,n)$ ≡ Second video signal corresponding to frame N, line n
  $v_E(N,n)$ ≡ Encoded video signal corresponding to frame N, line n.

Figure 1:
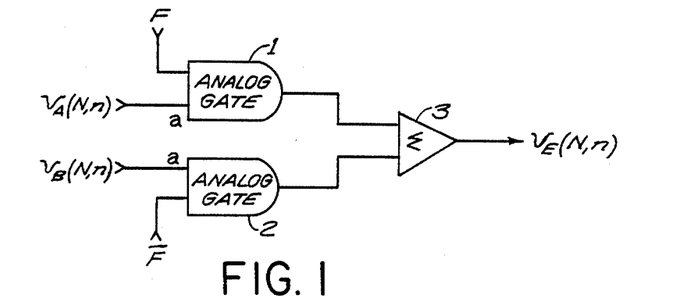
FIG. 1 is a block diagram of the video encoder utilized in conjunction with the Two Source Alternate Frame Encoding method.

The encoder implementation is shown in FIG. 1. As shown therein, a first video signal, $v_A(N,n)$, is applied to Analog Gate 1, (wherein the analog input is denoted by "a") and a second video signal, $v_b(N,n)$, is applied to Analog Gate 2. Analog Gates 1,2 pass their video input signals, under control of F and its logic inverse, $\bar{F}$, respectively, to Analog Summing Amplifier 3. The output of Analog Summing Amplifier 3 is the encoded video signal corresponding to the encoding function described by equation (1).

(b) Decoding

Referring to FIGS. 6f and 6g, the first video signal is recovered, during an odd numbered frame, by passing the encoded video signal corresponding to the current frame, while during an even numbered frame, by passing the one frame delayed encoded video signal corresponding to the preceding frame, with its chrominance component inverted. The second video signal is recovered, during an even numbered frame, by passing the encoded video signal corresponding to the current frame, while during an odd numbered frame, by passing the one frame delayed encoded video signal corresponding to the preceding frame, with its chrominance component inverted.

The decoding function for the Two Source Alternate Frame Method may be written as:

$$v_a(N,n) = [v_E(N,n)] \cdot [F] + [v_E^*(N-1,n)] \cdot [\bar{F}] \quad (2)$$

$$v_b(N,n) + [v_E^*(N-1,n)] \cdot [F] + [v_E(N,n)] \cdot [\bar{F}] \quad (3)$$

where:
  Symbolic notation is as previously defined, and in addition:
  $v_a(N,n)$ ≡ Decoded first video signal corresponding to frame N, line n
  $v_b(N,n)$ ≡ Decoded second video signal corresponding to frame N, line n $v_E^*(N-1,n)$ ≡ Encoded video signal corresponding to frame N−1, line n, with inverted chrominance component.

The resulting video signals that are displayed on a non-standard television receiver is found by performing the specified decoding function on the encoded video signal. The result may be expressed as:

$$v_a(N,n) = [v_A(N,n)] \cdot [F] + [v_A^*(N-1,n)] \cdot [\bar{F}] \quad (4)$$

$$v_b(N,n) = [v_B^*(N-1,n)] \cdot [F] + [v_B(N,n)] \cdot [\bar{F}]. \quad (5)$$

Figure 2:
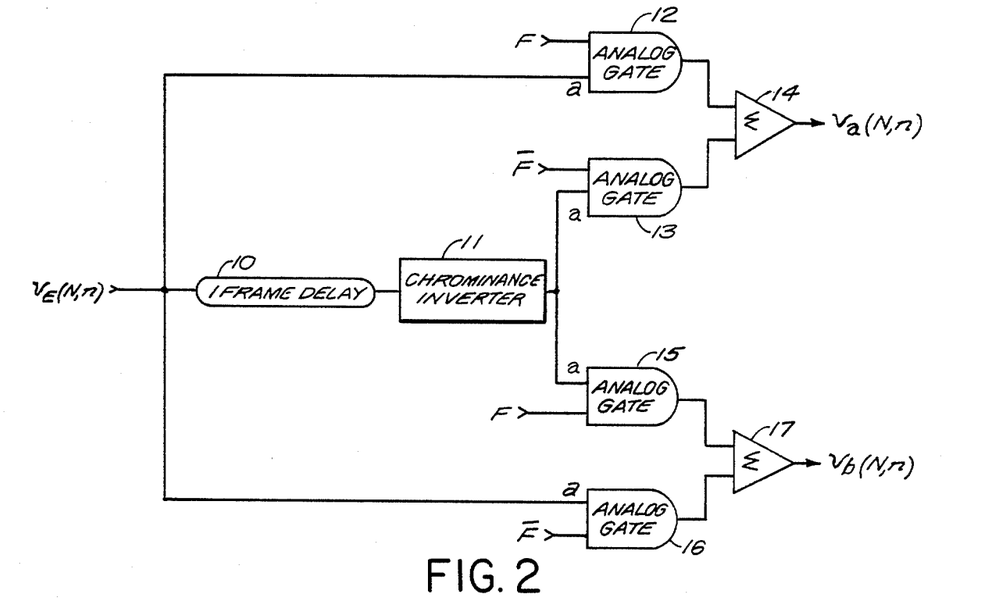
FIG. 2 is a block diagram of the video decoder utilized in conjunction with the Two Source Alternate Frame and Two Source Alternate Merged Frame Decoding methods.

The decoder implementation is shown in FIG. 2. As shown therein, the received encoded video signal, $v_E(N,n)$, is applied to Frame Delay Unit 10, to provide the one frame delayed signal, $v_E(N-1,n)$. This signal is applied to Chrominance Inverter 11, to yield the one frame delayed chrominance inverted signal $v_E^*(N-1,n)$. Analog Gates 12 and 13 pass their input video signals under control of F and $\overline{F}$, respectively, to Analog Summing Amplifier 14, to form the decoded first video signal $v_a(N,n)$, corresponding to equation (4). Similarly, Analog Gates 15 and 16, in conjunction with Analog Summing Amplifier 17, form the decoded second video signal, $v_b(N,n)$, corresponding to equation (5).

Since the encoding method deletes alternate frames from each video source, the resultant decoded display of each video source is a repeat frame rendition, which may result in motion jerkiness when the image motion exceeds a specified rate.

The Two Source Alternate Merged Frame Method described below, avoids this problem by merging contiguous frame pairs for each video source.

II. The Two Source Alternate Merged Frame Method (a) Encoding

Referring to FIG. 6h, the encoded video signal is formed by merging the first video signal, corresponding to the current odd numbered frame, with the one frame delayed first video signal, corresponding to the preceding even numbered frame, with its chrominance component inverted, to yield a first merged frame component. Similarly, a second merged frame component is formed by merging the second video signal, corresponding to the current even numbered frame, with the one frame delayed second video signal, corresponding to the preceding odd numbered frame, with its chrominance component inverted. These merged frame components are multiplexed at the television frame rate, with the switching occurring between successive frames.

The encoding function for the Two Source Alternate Merged Frame Method may be written as:

$$v_E(N,n) = [v_A(N,n) + v_A^*(N-1,n)] \cdot [F] + [v_B(N,n) + v_B^*(N-1,n)] \cdot [\overline{F}] \qquad (6)$$

where:

Symbolic notation is as previously defined, and in addition:

$v_A^*(N-1,n) \equiv$ First video signal corresponding to frame $N-1$, line n, with inverted chrominance component $v_B^*(N-1,n) \equiv$ Second Video signal corresponding to frame $N-1$, line n, with inverted chrominance component.

Figure 3:
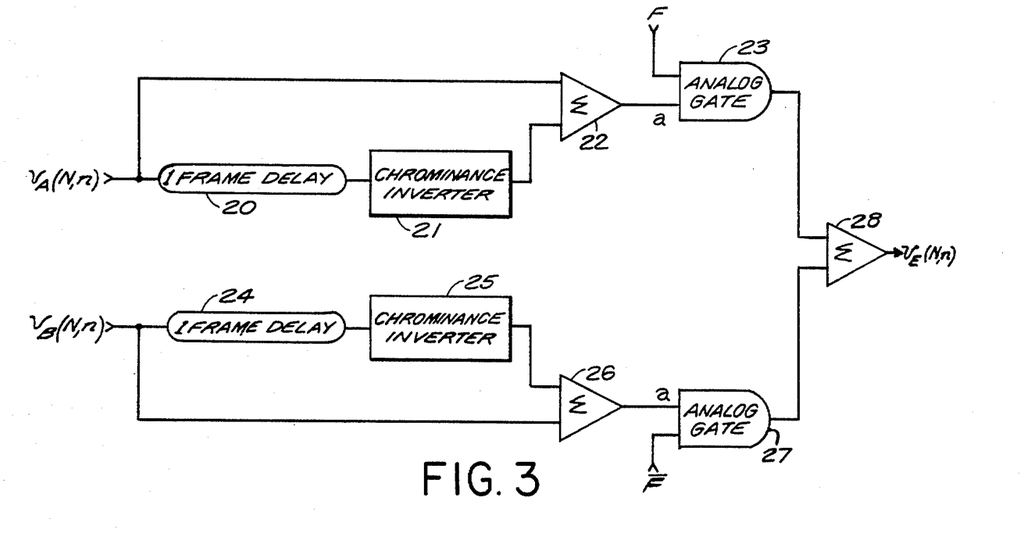
FIG. 3 is a block diagram of the video encoder utilized in conjunction with the Two Source Alternate Merged Frame Encoding method.

The encoder implementation is shown in FIG. 3. As shown therein, the first video signal, $v_A(N,n)$, is applied to Frame Delay Unit 20, yielding $v_A(N-1,n)$. This signal is applied to Chrominance Inverter 21, to produce the signal $v_A^*(N-1,n)$. Analog Summing Amplifier 22 provides the first merged frame component, $v_A(N,n) + v_A^*(N-1,n)$. In an identical manner, Analog Summing Amplifier 26, in conjunction with Frame Delay Unit 24 and Chrominance Inverter 25, provides the second merged frame component, $v_B(N,n) + v_B^*(N-1,n)$. These components are gated by their respective Analog Gates 23 and 27, under control of F and $\overline{F}$, into Analog Summing Amplifier 28, to yield the encoded video signal corresponding to the encoding function described by equation (6).

(b) Decoding

Referring to FIGS. 6i and 6j, the two merged frame signals, corresponding to each of the encoded sources, are decoded by the same decoder used in the Two Source Alternate Frame Method, and its description is applicable. The resulting decoded signals may be written as:

$$v_a(N,n) = [v_A(N,n) + v_A^*(N-1,n)] \cdot [F] + [v_A^*(N-1,n) + v_A(N-2,n)] \cdot [\overline{F}] \qquad (7)$$

$$v_b(N,n) = [v_B^*(N-1,n) + v_B(N-2,n)] \cdot [F] + [v_B(N,n) + v_B^*(N-1,n)] \cdot [\overline{F}] \qquad (8)$$

SINGLE SOURCE HALF STANDARD BANDWIDTH SYSTEM

The encoding and decoding methods described above, which allow the conveyance of two real-time television pictures over a standard bandwidth channel, may be adapted to convey a single real-time television picture over a half bandwidth channel since the video information rate per channel bandwidth is unaltered.

I. Encoding

Referring to FIG. 6k, during those frame pairs corresponding to $Z=1$ (see FIG. 6c), the video signal of the single video source is shifted into a first pair of cascaded Analog Shift Registers at the standard clock rate, while during those frame pairs corresponding to $Z=0$, the video signal of the single video source is shifted into a second pair of cascaded Analog Shift Registers at the standard clock rate. Also during those frame pairs corresponding to $Z=0$, the first pair of Analog Shift Registers, which was loaded during the previous frame pair ($Z=1$) is shifted out at half the standard clock rate, and their individual outputs, with appropriate chrominance inversion, are summed to yield a first half-bandwidth video component. Similarly, during those frame pairs corresponding to $Z=1$, the second pair of Analog Shift Registers, which was loaded during the previous frame pair ($Z=0$) is shifted out at half the standard clock rate, and their individual outputs, with appropriate chrominance inversion, are summed to yield a second half-bandwidth video component. These half-bandwidth video components are summed to yield the half-bandwidth encoded video signal.

Figure 4:
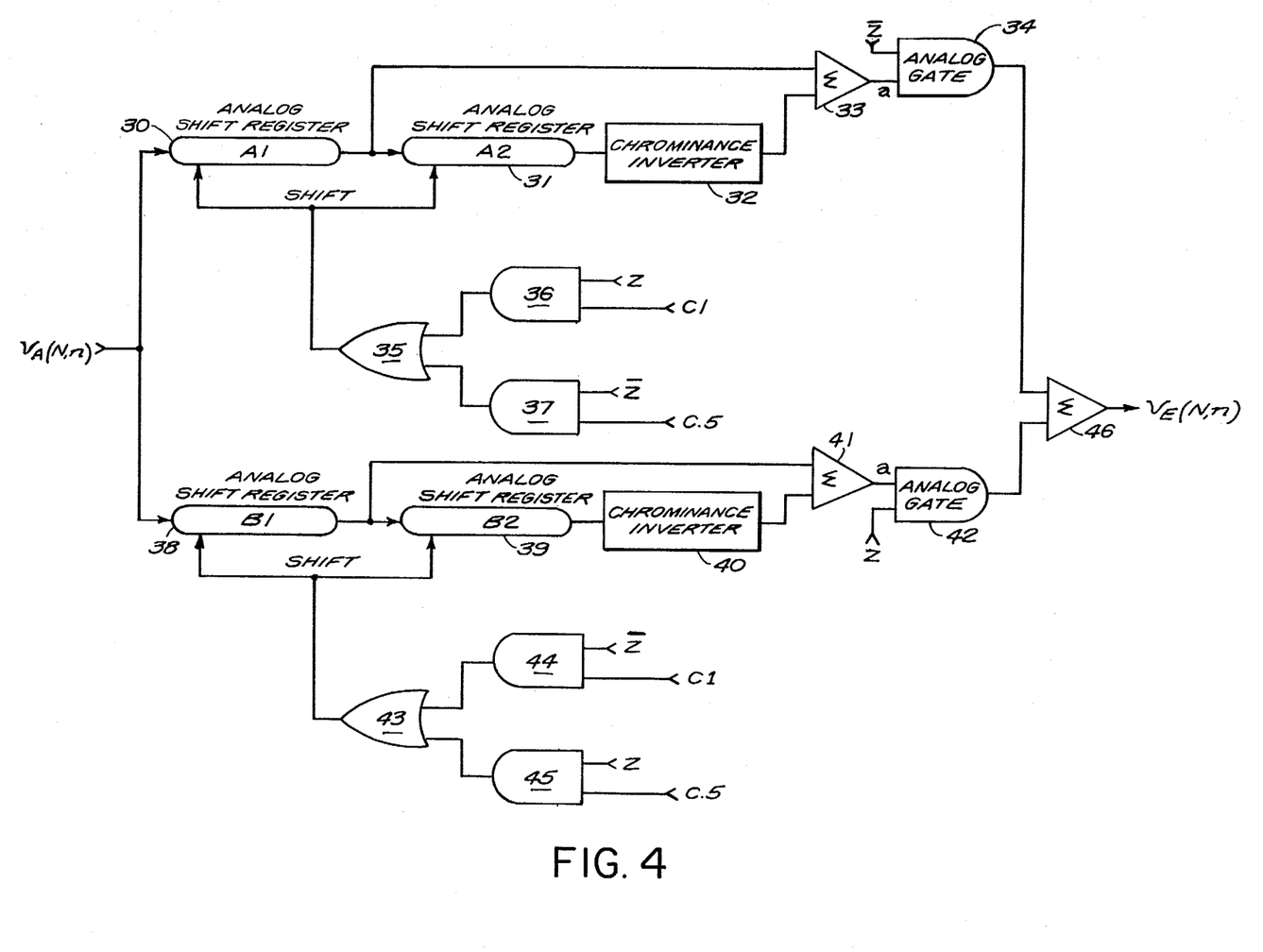
FIG. 4 is a block diagram of the video encoder utilized in conjunction with the Single Source Half Standard Bandwidth Encoding method.

The encoder implementation is illustrated in FIG. 4. As shown therein, the source video signal, $v_A(N,n)$, is applied to Analog Shift Register pairs A1-A2 (30 and 31) and B1-B2 (38 and 39). Each Analog Shift Register is capable of storing a complete frame of video information. During the frame pair designated by $Z=1$, two contiguous video frames of the source signal are shifted into the Register pair A1-A2 by the standard rate Shift Clock C1 by means of logic elements 36 and 35. During the succeeding frame pair designated by $Z=0$, the Register pair A1-A2 is shifted out by the half rate Shift Clock C.5 by means of logic elements 37 and 35. The resulting outputs, with appropriate chrominance inversion, provided by Chrominance Inverter 32, are summed by Analog Summing Amplifier 33. The resulting signal is then gated by Analog Gate 34, under control of $\overline{Z}$ to provide one input to Analog Summing Amplifier 46.

In an identical manner, the Register pair B1–B2 is loaded and read out during conjugate frame pairs to provide a second input to Analog Summing Amplifier 46.

The output of Analog Summing Amplifier 46 is the half-bandwidth encoded video signal shown in FIG. 6k.

II. Decoding

Referring to FIG. 6l, during those frame pairs corresponding to Z=0 (see FIG. 6c), the received half-bandwidth encoded video signal is shifted into a first Analog Shift Register at half the standard clock rate, while during those frame pairs corresponding to Z=1, the received half-bandwidth encoded video signal is shifted into a second Analog Shift Register at half the standard clock rate. Also, during those frame pairs corresponding to Z=1, the first Analog Shift Register which was loaded during the previous frame pair (Z=0) is shifted out and recirculated at the standard clock rate to provide the first stored frame video followed by its repeat, at the standard video bandwidth, to yield a first video component.

Similarly, during those frame pairs corresponding to Z=0, the second Analog Shift Register which was loaded during the previous frame pair (Z=1) is shifted out and recirculated at the standard clock rate to provide the second stored frame video followed by its repeat, at the standard video bandwidth, to yield a second video component. These video components are summed, with appropriate chrominance inversion to provide the decoded video signal.

Figure 5:
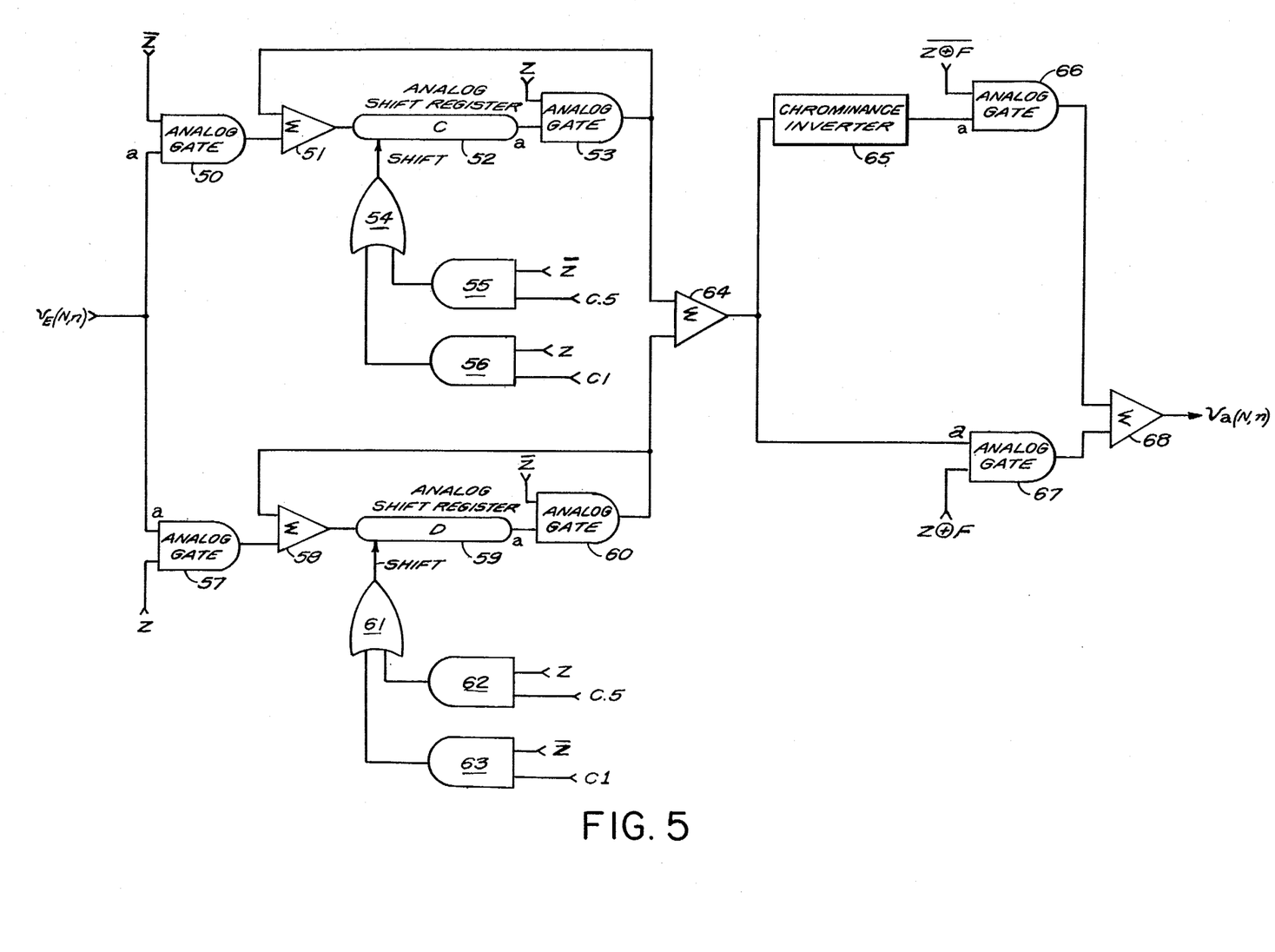
FIG. 5 is a block diagram of the video decoder utilized in conjunction with the Single Source Half Standard Bandwidth Decoding method.

The decoder implementation is illustrated in FIG. 5. As shown therein, the received encoded video signal $v_E(N,n)$ is applied to Analog Gates 50 and 57. Analog Gate 50, under control of $\overline{Z}$, allows the received video signal to be shifted into Analog Shift Register 52, by means of Analog Summing Amplifier 51, at half the standard clock rate C.5, by means of logic elements 55 and 54. Analog Gate 57, under control of Z, allows the received video signal to be shifted into Analog Shift Register 59, by means of Analog Summing Amplifier 58, at half the standard clock rate C.5 by means of logic elements 62 and 61. During the time that Analog Shift Register 59 is being loaded (Z=1), at half the standard clock rate, Analog Shift Register 52 is read out (shifted) and recirculated at the standard clock rate B1 by means of logic elements 56, 54, 53 and Analog Shift Register 52 is being loaded (Z=0), at half the standard clock rate, Analog Shift Register 59 is read out (shifted) and recirculated at the standard clock rate C1 by means of logic elements 63, 61, 60 and Analog Summing Amplifier 58. The resulting video signals appearing at the outputs of Analog Gates 53 and 60 are summed by Analog Summing Amplifier 64. The resulting video signal is applied to Analog Gate 67 and Chrominance Inverter 65.

The Chrominance inverted signal is applied to Analog Gate 66. Analog Gates 66 and 67 are controlled by logic signal $\overline{Z \oplus F}$ and $Z \oplus F$, respectively (see FIG. 6d), to provide input video signals to Analog Summing Amplifier 68. The output of this amplifier is the decoded video signal.

In the described exemplary encoder embodiments, the two source video signals are time multiplexd at the frame rate. In the corresponding exemplary decoder embodiments, the display video signals corresponding to the two source video signals are recovered by time demultiplexing the received encoded video signal at the frame rate. The exemplary embodiments, however, are not intended to restrict the encoder multiplexing and the corresponding decoder demultiplexing to the frame rate. Indeed, the encoder multiplexing and decoder multiplexing may be performed at the TV line rate. In the case of the Two Source Alternate Frame Method, described above, the encoder is modified to multiplex the two video signals corresponding to each of the video sources at the television line rate rather than the frame rate and the decoder is modified to multiplex the encoded video signal corresponding to the current frame and the one frame delayed encoded video signal, corresponding to the preceding frame, with its chrominance component inverted, at the line rate. Similarly, in the case of the Two Source Alternate Merged Frame Method, the encoder is modified to multiplex the two merged frame components corresponding to each of the video sources at the line rate rather than the frame rate and the decoder is modified to multiplex the encoded video signal corresponding to the current frame and the one frame delayed encoded video signal, corresponding to the preceding frame, with its chrominance component inverted, at the line rate.

Referring to FIGS. 1, 2 and 3, these modifications may be effected by replacing the gating signals shown therein, F and $\overline{F}$, with signals $\overline{F \oplus y}$ and $F \oplus y$, respectively. $F \oplus y$ represents the logical Exclusive OR function of F and y, $\overline{F \oplus y}$ represents the complement of $F \oplus y$ and y is a derived binary logic signal which is preset at the beginning of a frame, and toggles from line to line, as illustrated in the above-referenced U.S. Pat. No. 4,287,528. The F signal is as previously defined.

Although not specifically indicated, the decoded video signals representing the imagery of the first and second video sources, are each processed by conventional luminance and chrominance circuitry to provide the Y, (R−Y), (G−Y) and (B−Y) signals as required by a three gun (or equivalent) picture tube. The chrominance circuitry includes a chrominance demodulator.

As indicated in the exemplary encoder and decoder embodiments, the function of the Chrominance Inverter is to correct the phase of the delayed (by an odd number of television lines) video signal relative to the chrominance subcarrier reference signal.

The equivalent function may be performed by alternating, at the applicable rate and time, the polarity of the chrominance subcarrier reference signal as applied to the chrominance demodulator, thus permitting the deletion of the Chrominance Inverter and associated circuitry from the exemplary decoder embodiments.

It is noted that in the Single Source Half Standard Bandwidth System, each of the Analog Shift Registers is capable of storing a complete video frame. The standard clock rate which is used to shift the standard bandwidth video signals into and out of the Analog Shift Registers must satisfy the Sampling Theorem, which requires the rate to be somewhat greater than twice the frequency of interest.

The "bit" length of each of the Analog Shift Registers is determined as the product of: (a) the time (seconds) per TV frame; and (b) the frequency (Hertz) of the Shift Clock.

COMPONENT CONSIDERATIONS

The components used in the described encoder and decoder embodiments all utilize conventional technologies, however, the currently emerging charge coupled device (CCD) technology may provide a significant cost and size advantage when applied to the Frame Delay Units and Analog Shift Registers therein.

Fairchild Camera and Instrument Corp. is currently developing a television field store device based on charge coupled device technology. The design objectives of this device are to provide storage capacity of 640×256 picture elements, corresponding to 164,840 analog "bits" at a maximum bit rate of 12 MHz, on a chip area of 170 mil.×760 mil.

Although the invention has been described as applied to the NTSC system of television, it can, with suitable modification, be made to apply to other television systems such as, for example, modified NTSC (625 lines/50 fields), Phase Alternation Line (PAL) or Sequential with Memory (SECAM). Similarly, although the invention has been described as applied to color television systems, it is also applicable to monochromatic television systems.

Accordingly, it is clear that the above description of the alternative and preferred embodiments in no way limits the scope of the present invention which is defined by the following claims.

What is claimed is:

1. A television system comprising:
   (a) encoding means for forming a composite video signal of a first video signal and a second video signal in time synchronism with said first video signal, said encoding means including means for time multiplexing at the frame rate said first and second video signals;
   (b) means for transmitting said composite video signal to means for receiving said composite video signal, said receiving means including means for decoding said received composite video signal to obtain display video signals corresponding to said first and second video signals;
   (c) said decoding means including:
      (1) means for delaying said received composite video signal for one frame time:
      (2) means for correcting the chrominance phase of said one frame delayed composite video signal relative to the chrominance subcarrier reference signal; and
      (3) means for time multiplexing at the frame rate said received composite video signal and said chrominance phase corrected one frame delayed composite video signal to obtain said display video signals.

2. A television system as recited in claim 1 further including means for displaying said decoded display video signals to render the imagery corresponding to said first and second video signals.

3. A television system as recited in claim 2 wherein said first and second video signals comprise a stereoscopic pair.

4. A television system as recited in claim 3 wherein said displaying means includes means for converting said decoded display video signals into a time multiplexed video signal for time sequential stereoscopic presentation on a single display device.

5. A television system as recited in claim 4 wherein said converting means comprises a 2:1 interlace converter.

6. A television system as recited in claim 5 wherein said single display device comprises a cathode ray tube.

7. A television system as recited in claim 4 wherein said converting means comprises a double 2:1 interlace converter.

8. A television system as recited in claim 7 wherein said single display device comprises a cathode ray tube.

9. A television system as recited in claim 4 wherein said converting means comprises a 4:1 interlace converter.

10. A television system as recited in claim 9 wherein said single display device comprises a cathode ray tube.

11. A television system comprising:
    (a) encoding means for forming a composite video signal of a first video signal and a second video signal in time synchronism with said first video signal, said encoding means including means for time multiplexing at the line rate said first and second video signals;
    (b) means for transmitting said composite video signal to means for receiving said composite video signal, said receiving means including means for decoding said received composite video signal to obtain display video signals corresponding to said first and second video signals;
    (c) said decoding means including:
       (1) means for delaying said received composite video signal for one frame time:
       (2) means for correcting the chrominance phase of said one frame delayed composite video signal relative to the chrominance subcarrier reference signal; and
       (3) means for time multiplexing at the line rate said received composite video signal and said chrominance phase corrected one frame delayed composite video signal to obtain said display video signals.

12. A television system as recited in claim 11 further including means for displaying said decoded display video signals to render the imagery corresponding to said first and second video signals.

13. A television system as recited in claim 12 wherein said first and second video signals comprise a stereoscopic pair.

14. A television system as recited in claim 13 wherein said displaying means includes means for converting said decoded display video signals into a time multiplexed video signal for time sequential stereoscopic presentation on a single display device.

15. A television system as recited in claim 14 wherein said converting means comprises a 2:1 interlace converter.

16. A television system as recited in claim 15 wherein said single display device comprises a cathode ray tube.

17. A television system as recited in claim 14 wherein said converting means comprises a double 2:1 interlace converter.

18. A television system as recited in claim 17 wherein said single display device comprises a cathode ray tube.

19. A television system as recited in claim 14 wherein said converting means comprises a 4:1 interlace converter.

20. A television system as recited in claim 19 wherein said single display device comprises a cathode ray tube.

21. A television system comprising:
    (a) encoding means for forming a composite video signal of a first video signal and a second video signal in time synchronism with said first video signal, said encoding means including:
       (1) first means for delaying said first video signal for one frame time;
       (2) second means for delaying said second video signal for one frame time;

(3) means for correcting the chrominance phase of said one frame delayed first video signal and said one frame delayed second video signal relative to the chrominance subcarrier reference signal;
(4) means for forming a first and second sum signal, said first sum signal comprising the sum of said first video signal and said chrominance phase corrected one frame delayed first video signal, and said second sum signal comprising the sum of said second video signal and said chrominance phase corrected one frame delayed second video signal; and
(5) means for time multiplexing at the frame rate said first and second sum signals to form said composite video signal;

(b) means for transmitting said composite video signal to means for receiving said composite video signal, said receiving means including means for decoding said received composite video signal to obtain display video signals corresponding to said first and second video signals;

(c) said decoding means including:
(1) means for delaying said received composite video signal for one frame time;
(2) means for correcting the chrominance phase of said one frame delayed composite video signal relative to the chrominance subcarrier reference signal; and
(3) means for time multiplexing at the frame rate said received composite video signal and said chrominance phase corrected one frame delayed composite video signal to obtain said display video signals.

22. A television system as recited in claim 21 further including means for displaying said decoded display video signals to render the imagery corresponding to said first and second video signals.

23. A television system as recited in claim 22 wherein said first and second video signals comprise a stereoscopic pair.

24. A television system as recited in claim 23 wherein said displaying means includes means for converting said decoded display video signals into a time multiplexed video signal for time sequential stereoscopic presentation on a single display device.

25. A television system as recited in claim 24 wherein said converting means comprises a 2:1 interlace converter.

26. A television system as recited in claim 25 wherein said single display device comprises a cathode ray tube.

27. A television system as recited in claim 24 wherein said converting means comprises a double 2:1 interlace converter.

28. A television system as recited in claim 27 wherein said single display device comprises a cathode ray tube.

29. A television system as recited in claim 24 wherein said converting means comprises a 4:1 interlace converter.

30. A television system as recited in claim 29 wherein said single display device comprises a cathode ray tube.

31. A television system comprising:
(a) encoding means for forming a composite video signal of a first video signal and a second video signal in time synchronism with said first video signal, said encoding means including:
(1) first means for delaying said first video signal for one frame time;
(2) second means for delaying said second video signal for one frame time;
(3) means for correcting the chrominance phase of said one frame delayed first video signal and said one frame delayed second video signal relative to the chrominance subcarrier reference signal;
(4) means for forming a first and second sum signal, said first sum signal comprising the sum of said first video signal and said chrominance phase corrected one frame delayed first video signal, and said second sum signal comprising the sum of said second video signal and said chrominance phase corrected one frame delayed second video signal; and
(5) means for time multiplexing at the line rate said first and second sum signals to form said composite video signal;

(b) means for transmitting said composite video signal to means for receiving said composite video signal, said receiving means including means for decoding said received composite video signal to obtain display video signals corresponding to said first and second video signals;

(c) said decoding means including:
(1) means for delaying said received composite video signal for one frame time;
(2) means for correcting the chrominance phase of said one frame delayed composite video signal relative to the chrominance subcarrier reference signal; and
(3) means for time multiplexing at the line rate said received composite video signal and said chrominance phase corrected one frame delayed composite video signal to obtain said display video signals.

32. A television system as recited in claim 31 further including means for displaying said decoded display video signals to render the imagery corresponding to said first and second video signals.

33. A television system as recited in claim 32 wherein said first and second video signals comprise a stereoscopic pair.

34. A television system as recited in claim 33 wherein said displaying means includes means for converting said decoded display video signals into a time multiplexed video signal for time sequential stereoscopic presentation on a single display device.

35. A television system as recited in claim 34 wherein said converting means comprises a 2:1 interlace converter.

36. A television system as recited in claim 35 wherein said single display device comprises a cathode ray tube.

37. A television system as recited in claim 34 wherein said converting means comprises a double 2:1 interlace converter.

38. A television system as recited in claim 37 wherein said single display device comprises a cathode ray tube.

39. A television system as recited in claim 34 wherein said converting means comprises a 4:1 interlace converter.

40. A television system as recited in claim 39 wherein said single display device comprises a cathode ray tube.

41. A television system a comprising:
(a) means for providing a real-time video signal;
(b) encoding means for forming a time scaled merged frame video signal from said real-time video signal; said encoding means including means for merging sequential frame pairs of said real-time video signal to form a real-time merged frame video signal; and means for time scaling said real-time merged framed video signal such that the standard frame transmission time is scaled by a predetermined factor and the standard video channel bandwidth is scaled by the inverse of the predetermined factor;
(c) means for transmitting said time scaled merged frame video signal to means for receiving said time scaled merged frame video signal, said receiving time scaled merged frame video signal to obtain a display video signal corresponding to said real-time video signal; and
(d) said decoding means including means for time descaling said received time scaled merged frame video signal to obtain said display video signal.

42. A television system as recited in claim 41 further including means for displaying said decoded display video signal to render the imagery corresponding to said real-time video signal.

43. A television system as recited in claim 42 wherein the predetermined scaling factor is the multiplicative constant two.

44. A television system comprising:
(a) encoding means for forming a composite video signal of a first video signal and a second video signal in time synchronism with said first video signal, said encoding means including means for time multiplexing at the line rate said first and second video signals;
(b) means for transmitting said composite video signal to means for receiving said composite video signal, said receiving means including means for decoding said received composite video signal to obtain display video signals corresponding to said first and second video signals;
(c) said decoding means including:
  (1) means for delaying said received composite video signal for one line time;
  (2) means for correcting the chrominance phase of said one line delayed composite video signal relative to the chrominance subcarrier reference signal; and
  (3) means for time multiplexing at the line rate said received composite video signal and said chrominance phase corrected one line delayed composite video signal to obtain said display video signals.

45. A television system as recited in claim 44 further including means for displaying said decoded display video signals to render the imagery corresponding to said first and second video signals.

46. A television system as recited in claim 45 wherein said first and second video signals comprise a stereoscopic pair.

47. A television system as recited in claim 46 wherein said displaying means includes means for converting said decoded display video signals into a time multiplexed video signal for time sequential stereoscopic presentation on a single display device.

48. A television system as recited in claim 47 wherein said converting means comprises a 2:1 interlace converter.

49. A television system as recited in claim 48 wherein said single display device comprises a cathode ray tube.

50. A television system as recited in claim 47 wherein said converting means comprises a double 2:1 interlace converter.

51. A television system as recited in claim 50 wherein said single display device comprises a cathode ray tube.

52. A television system as recited in claim 47 wherein said converting means comprises a 4:1 interlace converter.

53. A television system as recited in claim 52 wherein said single display device comprises a cathode ray tube.

54. A television system comprising:
(a) encoding means for forming a composite video signal of a first video signal and a second video signal in time synchronism with said first video signal, said encoding means including:
  (1) first means for delaying said first video signal for one frame time;
  (2) second means for delaying said second video signal for one frame time;
  (3) means for correcting the chrominance phase of said one frame delayed first video signal and said one frame delayed second video signal relative to the chrominance subcarrier reference signal;
  (4) means for forming a first and second sum signal, said first sum signal comprising the sum of said first video signal and said chrominance phase corrected one frame delayed first video signal, and said second sum signal comprising the sum of said second video signal and said chrominance phase corrected one frame delayed second video signal; and
  (5) means for time multiplexing at the line rate said first and second sum signals to form said composite video signal;
(b) means for transmitting said composite video signal to means for receiving said composite video signal, said receiving means including means for decoding said received composite video signal to obtain display video signals corresponding to said first and second video signals;
  (1) means for delaying said received composite video signal for one line time;
  (2) means for correcting the chrominance phase of said one line delayed composite video signal relative to the chrominance subcarrier reference signal; and
  (3) means for time multiplexing at the line rate said received composite video signal and said chrominance phase corrected one line delayed composite video signal to obtain said display video signals.

55. A television system as recited in claim 54 further including means for displaying said decoded display video signals to render the imagery corresponding to said first and second video signals.

56. A television system as recited in claim 55 wherein said first and second video signals comprise a stereoscopic pair.

57. A television system as recited in claim 56 wherein said displaying means includes means for converting said decoded display video signals into a time multiplexed video signal for time sequential stereoscopic presentation on a single display device.

58. A television system as recited in claim 57 wherein said converting means comprises a 2:1 interlace converter.

59. A television system as recited in claim 58 wherein said single display device comprises a cathode ray tube.

60. A television system as recited in claim 57 wherein said converting means comprises a double 2:1 interlace converter.

61. A television system as recited in claim 59 wherein said single display device comprises a cathode ray tube.

62. A television system as recited in claim 57 wherein said converting means comprises a 4:1 interlace converter.

63. A television system as recited in claim 62 wherein said single display device comprises a cathode ray tube.

* * * * *